US012618808B2

(12) United States Patent　　　　　(10) Patent No.:　US 12,618,808 B2
Kumar KM et al.　　　　　　　　　　(45) Date of Patent:　　　May 5, 2026

(54) METHODS FOR DETECTING DEFECTS IN AN ANISOTROPIC ROTOR BLADE USING A PHASED ARRAY ULTRASOUND SYSTEM

(71) Applicant: GE Vernova Infrastructure Technology LLC, Greenville, SC (US)

(72) Inventors: Manoj Kumar KM, Bengaluru (IN); Sivaramanivas Ramaswamy, Bengaluru (IN); Prasad Thapa, Bengaluru (IN); Thomas Earnest Moldenhauer, Burnt Hills, NY (US)

(73) Assignee: GE Vernova Infrastructure Technology LLC, Greenville, SC (US)

( * ) Notice: Subject to any disclaimer, the term of this patent is extended or adjusted under 35 U.S.C. 154(b) by 528 days.

(21) Appl. No.: 18/164,912

(22) Filed: Feb. 6, 2023

(65) Prior Publication Data

US 2024/0264123 A1　　Aug. 8, 2024

(51) Int. Cl.
G01N 29/04　　　　(2006.01)
B64F 5/60　　　　　(2017.01)
(Continued)

(52) U.S. Cl.
CPC ............. G01N 29/262 (2013.01); B64F 5/60 (2017.01); G01N 29/069 (2013.01); G01N 29/265 (2013.01); *G01N 2291/106* (2013.01)

(58) Field of Classification Search
None
See application file for complete search history.

(56) References Cited

U.S. PATENT DOCUMENTS 4,106,327 A　*　8/1978　Adler ..................... G01N 29/07
　　　　　　　　　　　　　　　　　　　　73/598
5,172,343 A　　12/1992　O'Donnell
(Continued)

FOREIGN PATENT DOCUMENTS

EP　　　2881734 A1　　6/2015

OTHER PUBLICATIONS

European Search Report Corresponding to Application No. 24151568 on Apr. 24, 2024.
(Continued)

*Primary Examiner* — Alexander A Mercado
(74) *Attorney, Agent, or Firm* — Dority & Manning, P.A.

(57)　　　　　ABSTRACT
The method includes positioning a probe of the phased array ultrasound system on the mounting portion of the anisotropic rotor blade at the axial centerline. The method further includes scanning a sector of the anisotropic rotor blade along the axial centerline with the probe of the phased array ultrasound system. The method further includes determining a magnitude and a time delay of an echo signal corresponding with a geometric fiducial marker. The method further includes adjusting a position of one of the anisotropic rotor blade or the probe based on the magnitude and/or the time delay of the echo signal corresponding with the geometric fiducial marker. The method further includes repeating the scanning, determining, and adjusting steps until the magnitude and the time delay of the echo signal corresponding with the geometric fiducial marker is within a predetermined maximum echo range. The method further includes scanning the anisotropic rotor blade for defects.

20 Claims, 5 Drawing Sheets

400 ⌐

POSITION A PROBE OF THE PHASED ARRAY ULTRASOUND SYSTEM ON THE MOUNTING PORTION OF THE ANISOTROPIC ROTOR BLADE AT THE AXIAL CENTERLINE; ⌐402

SCAN A SECTOR OF THE ANISOTROPIC ROTOR BLADE ALONG THE AXIAL CENTERLINE WITH THE PROBE OF THE PHASED ARRAY ULTRASOUND SYSTEM, A GEOMETRIC FIDUCIAL MARKER DISPOSED AT LEAST PARTIALLY WITHIN THE SECTOR OF THE ANISOTROPIC ROTOR BLADE; ⌐404

DETERMINE A MAGNITUDE AND A TIME DELAY OF AN ECHO SIGNAL CORRESPONDING WITH THE GEOMETRIC FIDUCIAL MARKER; ⌐406

ADJUST A POSITION OF ONE OF THE ANISOTROPIC ROTOR BLADE OR THE PROBE BASED ON THE MAGNITUDE OF THE ECHO SIGNAL CORRESPONDING WITH THE GEOMETRIC FIDUCIAL MARKER; AND ⌐408

REPEAT THE SCANNING, DETERMINING, AND ADJUSTING STEPS UNTIL THE MAGNITUDE AND THE TIME DELAY OF THE ECHO SIGNAL CORRESPONDING WITH THE GEOMETRIC FIDUCIAL MARKER IS WITHIN A PREDETERMINED MAXIMUM ECHO RANGE; ⌐410

SCAN THE ANISOTROPIC ROTOR BLADE FOR DEFECTS. ⌐412

(51) Int. Cl.

| | |
|---|---|
| *G01N 29/06* | (2006.01) |
| *G01N 29/26* | (2006.01) |
| *G01N 29/265* | (2006.01) |

(56) References Cited

U.S. PATENT DOCUMENTS

| | | | | |
|---|---|---|---|---|
| 5,275,052 | A * | 1/1994 | Luttrell | G01N 29/26 73/620 |
| 5,329,930 | A | 7/1994 | Thomas, III et al. | |
| 6,789,427 | B2 | 9/2004 | Batzinger et al. | |
| 6,792,808 | B1 | 9/2004 | Batzinger et al. | |
| 7,150,193 | B2 | 12/2006 | Lorraine et al. | |
| 7,234,354 | B2 | 6/2007 | Barshinger et al. | |
| 7,302,851 | B2 | 12/2007 | Czerw et al. | |
| 7,305,885 | B2 | 12/2007 | Barshinger et al. | |
| 9,116,098 | B2 | 8/2015 | Batzinger | |
| 9,213,019 | B2 | 12/2015 | Falsetti et al. | |
| 9,239,317 | B2 | 1/2016 | Feydo | |
| 9,658,193 | B2 | 5/2017 | Jenkins et al. | |
| 12,442,798 | B2 * | 10/2025 | Yan | G01N 29/2468 |
| 2005/0126291 | A1 * | 6/2005 | Czerw | G01N 29/28 73/620 |
| 2008/0250860 | A1 * | 10/2008 | Clossen-von Lanken Schulz | G01N 29/11 73/627 |
| 2014/0216160 | A1 * | 8/2014 | Renzel | G01N 29/30 73/620 |
| 2017/0191966 | A1 | 7/2017 | Niri et al. | |
| 2023/0079690 | A1 * | 3/2023 | Yan | G01N 29/4472 702/39 |

OTHER PUBLICATIONS

Bolu et al., A Comparison of Methods Used to Predict the Vibrational Energy Required for a Reliable Thermosonic Inspection, NDT 2010 Conference Topics: Session 2C (I) Thermography, 2010, 12 Pages. Retrieved Oct. 6, 2022 from webpage: https://strathprints.strath.ac.uk/47532/1/2C1.pdf.

Cervellon et al., Crack Initiation Anisotropy of Ni-Based SX Superalloys in the Very High Cycle Fatigue Regime, Materials Science and Engineering: A, vol. 825, Sep. 21, 2021, 40 Pages. https://www.sciencedirect.com/science/article/abs/pii/S0921509321011862.

Charlesworth, Ultrasonic Phased Array Testing in the Power Generation Industry; Novel Wedge Development for the Inspection of Steam Turbine Blades Roots, Thesis submitted to University of Warwick, Nov. 2011, 317 Pages. (Part A and Part B) http://wrap.warwick.ac.uk/49401/7/WRAP_THESIS_Charlesworth_2011.pdf.

Lane, The Development of a 2D Ultrasonic Array Inspection for Single Crystal Turbine Blades, Springer Theses, University of Bristol, UK, 2014, 141 Pages. https://link.springer.com/book/10.1007/978-3-319-02517-9.

Raj et al., Non-Destructive Testing and Evaluation for Structural Integrity, Integrity of Engineering Components, Sadhana, vol. 20, Feb. 1995, pp. 5-38. https://link.springer.com/article/10.1007/BF02747282.

Strilka et al., Continuous Monitoring of Binary Gas Mixture Concentration with Application to Turbine Blade Cooling Experiments, 99-GT-365, Proceedings of the ASME 1999 International Gas Turbine and Aeroengine Congress and Exhibition, vol. 4: Manufacturing Materials and Metallurgy; Ceramics; Structures and Dynamics; Controls, Diagnostics and Instrumentation, Indianapolis, Indiana, Jun. 7-10, 1999, 10 Pages. https://asmedigitalcollection.asme.org/GT/proceedings/GT1999/78613/V004T04A021/248204.

Yang, Bin et al., Testing, Inspecting and Monitoring Technologies for Wind Turbine Blades: A Survey, Renewable and Sustainable Energy Reviews, vol. 22, Jun. 3, 2013, pp. 515-526. https://www.sciencedirect.com/science/article/abs/pii/S1364032113000129.

Yang, Ruizhen et al., Progress and Trends in Nondestructive Testing and Evaluation for Wind Turbine Composite Blade, Renewable and Sustainable Energy Reviews, vol. 60, Jul. 2016, pp. 1225-1250. https://www.sciencedirect.com/science/article/abs/pii/S1364032116002343.

* cited by examiner

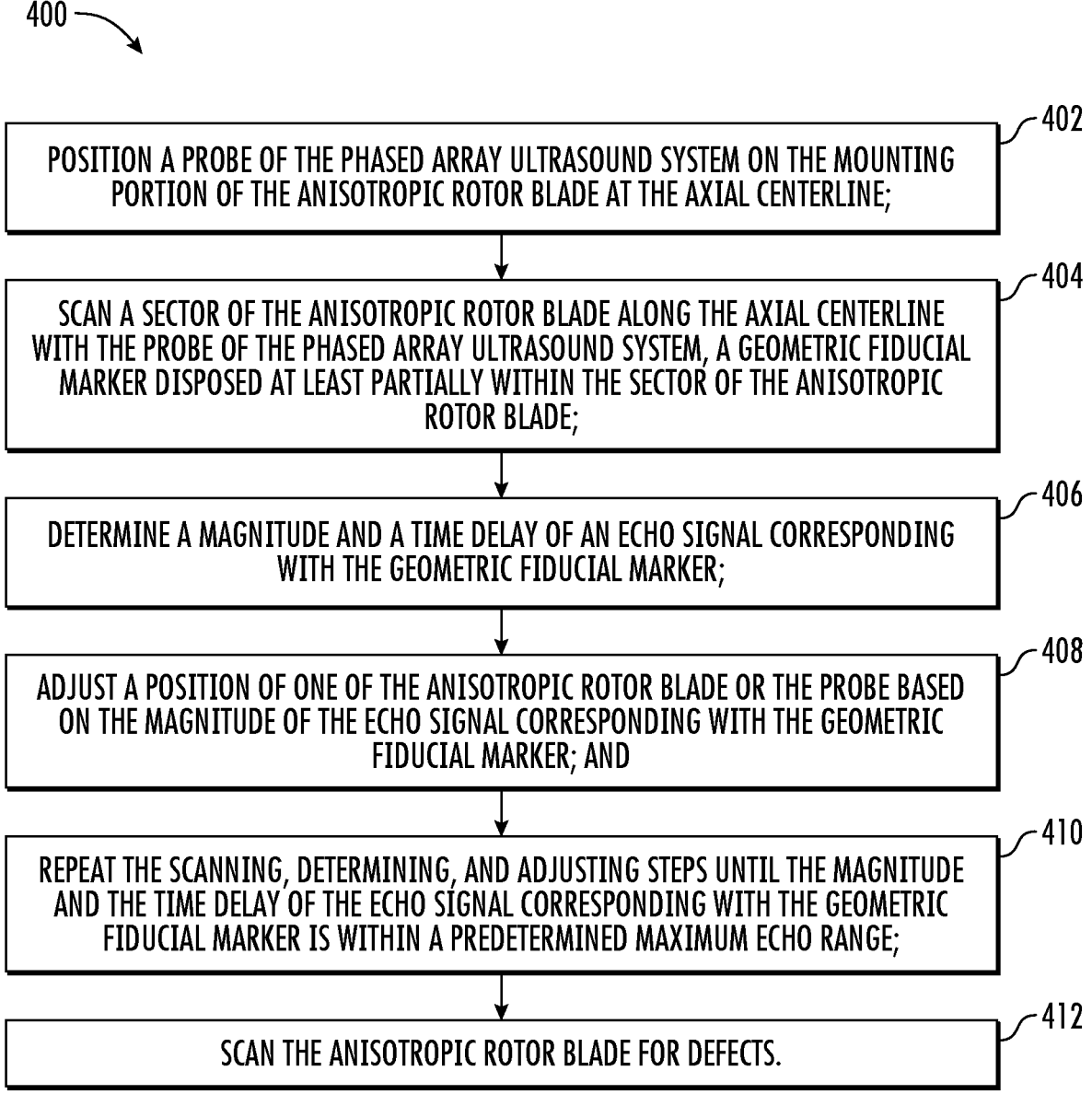

400

402
POSITION A PROBE OF THE PHASED ARRAY ULTRASOUND SYSTEM ON THE MOUNTING PORTION OF THE ANISOTROPIC ROTOR BLADE AT THE AXIAL CENTERLINE;

404
SCAN A SECTOR OF THE ANISOTROPIC ROTOR BLADE ALONG THE AXIAL CENTERLINE WITH THE PROBE OF THE PHASED ARRAY ULTRASOUND SYSTEM, A GEOMETRIC FIDUCIAL MARKER DISPOSED AT LEAST PARTIALLY WITHIN THE SECTOR OF THE ANISOTROPIC ROTOR BLADE;

406
DETERMINE A MAGNITUDE AND A TIME DELAY OF AN ECHO SIGNAL CORRESPONDING WITH THE GEOMETRIC FIDUCIAL MARKER;

408
ADJUST A POSITION OF ONE OF THE ANISOTROPIC ROTOR BLADE OR THE PROBE BASED ON THE MAGNITUDE OF THE ECHO SIGNAL CORRESPONDING WITH THE GEOMETRIC FIDUCIAL MARKER; AND

410
REPEAT THE SCANNING, DETERMINING, AND ADJUSTING STEPS UNTIL THE MAGNITUDE AND THE TIME DELAY OF THE ECHO SIGNAL CORRESPONDING WITH THE GEOMETRIC FIDUCIAL MARKER IS WITHIN A PREDETERMINED MAXIMUM ECHO RANGE;

412
SCAN THE ANISOTROPIC ROTOR BLADE FOR DEFECTS.

FIG. 4

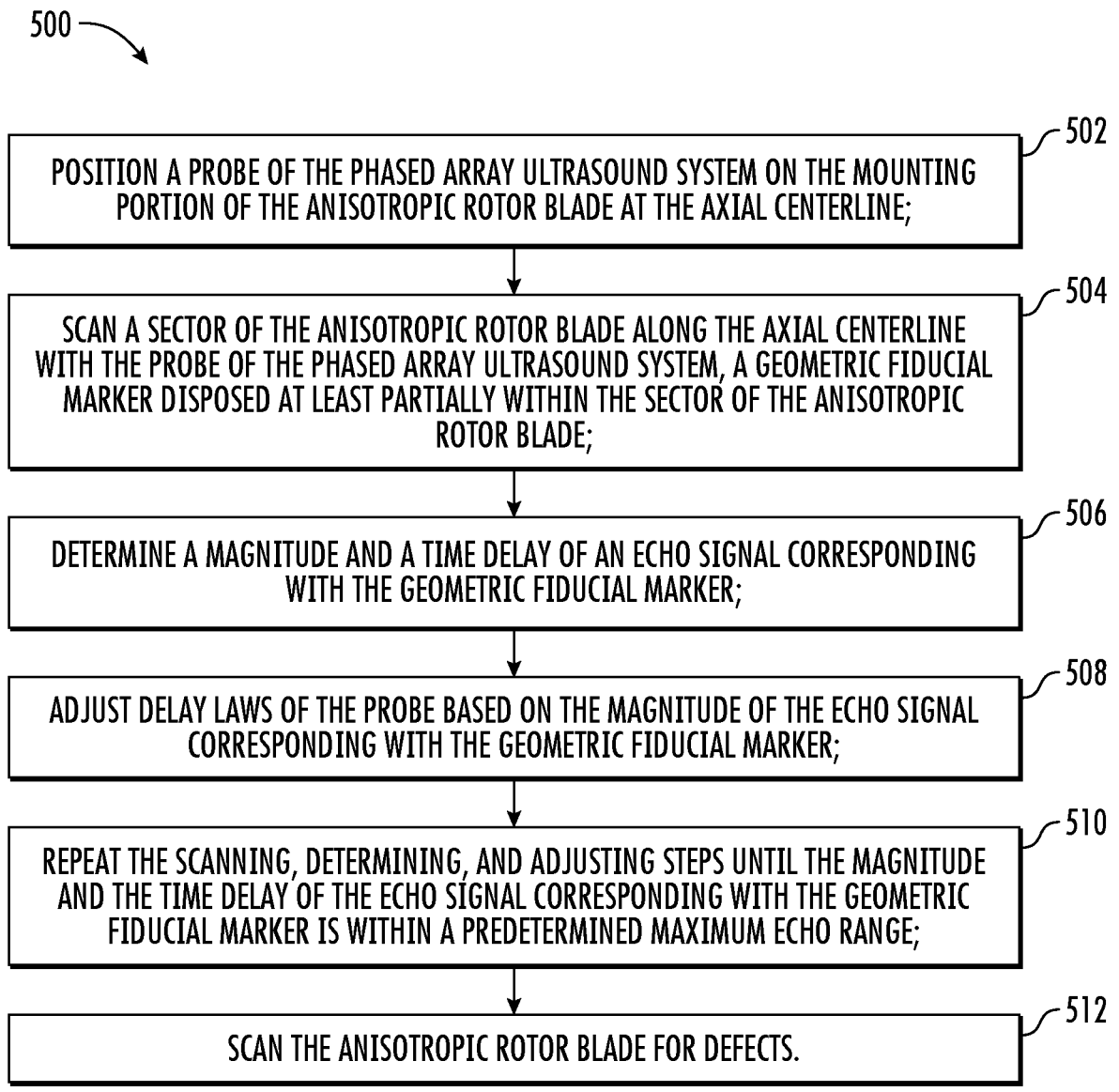

500

502

POSITION A PROBE OF THE PHASED ARRAY ULTRASOUND SYSTEM ON THE MOUNTING PORTION OF THE ANISOTROPIC ROTOR BLADE AT THE AXIAL CENTERLINE;

504

SCAN A SECTOR OF THE ANISOTROPIC ROTOR BLADE ALONG THE AXIAL CENTERLINE WITH THE PROBE OF THE PHASED ARRAY ULTRASOUND SYSTEM, A GEOMETRIC FIDUCIAL MARKER DISPOSED AT LEAST PARTIALLY WITHIN THE SECTOR OF THE ANISOTROPIC ROTOR BLADE;

506

DETERMINE A MAGNITUDE AND A TIME DELAY OF AN ECHO SIGNAL CORRESPONDING WITH THE GEOMETRIC FIDUCIAL MARKER;

508

ADJUST DELAY LAWS OF THE PROBE BASED ON THE MAGNITUDE OF THE ECHO SIGNAL CORRESPONDING WITH THE GEOMETRIC FIDUCIAL MARKER;

510

REPEAT THE SCANNING, DETERMINING, AND ADJUSTING STEPS UNTIL THE MAGNITUDE AND THE TIME DELAY OF THE ECHO SIGNAL CORRESPONDING WITH THE GEOMETRIC FIDUCIAL MARKER IS WITHIN A PREDETERMINED MAXIMUM ECHO RANGE;

512

SCAN THE ANISOTROPIC ROTOR BLADE FOR DEFECTS.

FIG. 5

METHODS FOR DETECTING DEFECTS IN AN ANISOTROPIC ROTOR BLADE USING A PHASED ARRAY ULTRASOUND SYSTEM

FIELD

The present disclosure relates generally to methods for detecting defects in an anisotropic rotor blade using a phased array ultrasound system. Particularly, the present disclosure is directed to calibrating a phased array ultrasound system based on geometric fiducial markers within the anisotropic rotor blade.

BACKGROUND

Turbomachines are utilized in a variety of industries and applications for energy transfer purposes. For example, a gas turbine engine generally includes a compressor section, a combustion section, a turbine section, and an exhaust section. The compressor section progressively increases the pressure of a working fluid entering the gas turbine engine and supplies this compressed working fluid to the combustion section. The compressed working fluid and a fuel (e.g., natural gas) mix within the combustion section and burn in a combustion chamber to generate high pressure and high temperature combustion gases. The combustion gases flow from the combustion section into the turbine section where they expand to produce work. For example, expansion of the combustion gases in the turbine section may rotate a rotor shaft connected, e.g., to a generator to produce electricity. The combustion gases then exit the gas turbine via the exhaust section.

Phased array ultrasonic testing (PAUT) is one type of scanning method/technique that is used to provide an image of an object or part to reveal flaws, defects, characteristics, or anomalies in the object (such as a gas turbine component). A phased linear array ultrasonic scanner has a plurality of electrically and acoustically independent ultrasonic transducers in a single linear array. By varying the timing of the electrical pulses applied to the ultrasonic transducers using delay criteria, a phased linear array ultrasonic probe can generate ultrasonic waves passing into the test object at different angles (e.g., from zero to one hundred eighty degrees) to try to detect anomalies and variances therein and to identify the orientation of those anomalies and variances.

In operation, the ultrasonic waves generated by the phased linear array ultrasonic probe are transmitted into the test object to which the probe is coupled. As the ultrasonic waves pass into the test object, various reflections, called echoes, occur as the ultrasonic waves interact with anomalies and other physical characteristics in the test object. Conversely, when the reflected ultrasonic waves are received by the piezoelectric surface of the ultrasonic transducers, it causes the transducers to vibrate which generates a voltage difference across the transducer electrodes that is detected as an electrical signal by signal processing electronics connected to the transducers through the cable. The signal processing circuits track the time difference between the transmission of the electrical pulses and the receipt of the electrical signals, and measure the amplitude of the received electrical signals to determine various attributes of any anomalies and characteristics of the object, such as depth, size, location, and orientation.

High pressure turbine blades in service are prone to cracking in and around cooling holes. Inspecting cooling passages pose considerable challenges as they are narrow and convoluted, making it difficult to use readily available probes or customize them to traverse through the convoluted space and provide reliable inspection. While ultrasonic methods have the advantage to probe these internal areas from blade's external surfaces, the complex external shapes pose extreme challenges for contact ultrasound method. Material anisotropy causes ghost echoes in the reflected ultrasonic signals. Given the cracks to detect are extremely small, signal to noise ratio from single element immersion ultrasonic technique is extremely poor and cannot be used.

As such, an improved method of detecting defects in an anisotropic rotor blade using a phased array ultrasonic system is desired and would be appreciated in the art.

BRIEF DESCRIPTION

Aspects and advantages of the methods in accordance with the present disclosure will be set forth in part in the following description, or may be obvious from the description, or may be learned through practice of the technology.

In accordance with one embodiment, a method for detecting defects in an anisotropic rotor blade using a phased array ultrasound system is provided. The anisotropic rotor blade extends along an axial centerline and includes a mounting portion and an airfoil. The method includes positioning a probe of the phased array ultrasound system on the mounting portion of the anisotropic rotor blade at the axial centerline. The method further includes scanning a sector of the anisotropic rotor blade along the axial centerline with the probe of the phased array ultrasound system. A geometric fiducial marker is disposed at least partially within the sector of the anisotropic rotor blade. The method further includes determining a magnitude and a time delay of an echo signal corresponding with the geometric fiducial marker. The method further includes adjusting a position of one of the anisotropic rotor blade or the probe based on the magnitude and/or the time delay of the echo signal corresponding with the geometric fiducial marker. The method further includes repeating the scanning, determining, and adjusting steps until the magnitude and the time delay of the echo signal corresponding with the geometric fiducial marker is within a predetermined maximum echo range. The method further includes scanning the anisotropic rotor blade for defects.

In accordance with another embodiment, a method for detecting defects in an anisotropic rotor blade using a phased array ultrasound system is provided. The anisotropic rotor blade extends along an axial centerline and includes a mounting portion and an airfoil. The method includes positioning a probe of the phased array ultrasound system on the mounting portion of the anisotropic rotor blade at the axial centerline. The method further includes scanning a sector of the anisotropic rotor blade along the axial centerline with the probe of the phased array ultrasound system. A geometric fiducial marker is disposed at least partially within the sector of the anisotropic rotor blade. The method further includes determining a magnitude and a time delay of an echo signal corresponding with the geometric fiducial marker. The method further includes adjusting delay laws of probe based on the magnitude and/or the time delay of the echo signal corresponding with the geometric fiducial marker. The method further includes repeating the scanning, determining, and adjusting steps until the magnitude and/or the time delay of the echo signal corresponding with the geometric fiducial marker is within a predetermined maximum echo range. The method further includes scanning the anisotropic rotor blade for defects.

These and other features, aspects and advantages of the present methods will become better understood with reference to the following description and appended claims. The accompanying drawings, which are incorporated in and constitute a part of this specification, illustrate embodiments of the technology and, together with the description, serve to explain the principles of the technology.

BRIEF DESCRIPTION OF THE DRAWINGS

A full and enabling disclosure of the present methods, including the best mode of making and using the present systems and methods, directed to one of ordinary skill in the art, is set forth in the specification, which makes reference to the appended figures, in which:

FIG. 4 is a flow chart of a method for detecting defects in an anisotropic rotor blade using a phased array ultrasound system in accordance with embodiments of the present disclosure; and FIG. 5 is a flow chart of a method for detecting defects in an anisotropic rotor blade using a phased array ultrasound system in accordance with embodiments of the present disclosure.

DETAILED DESCRIPTION

Figure 1:
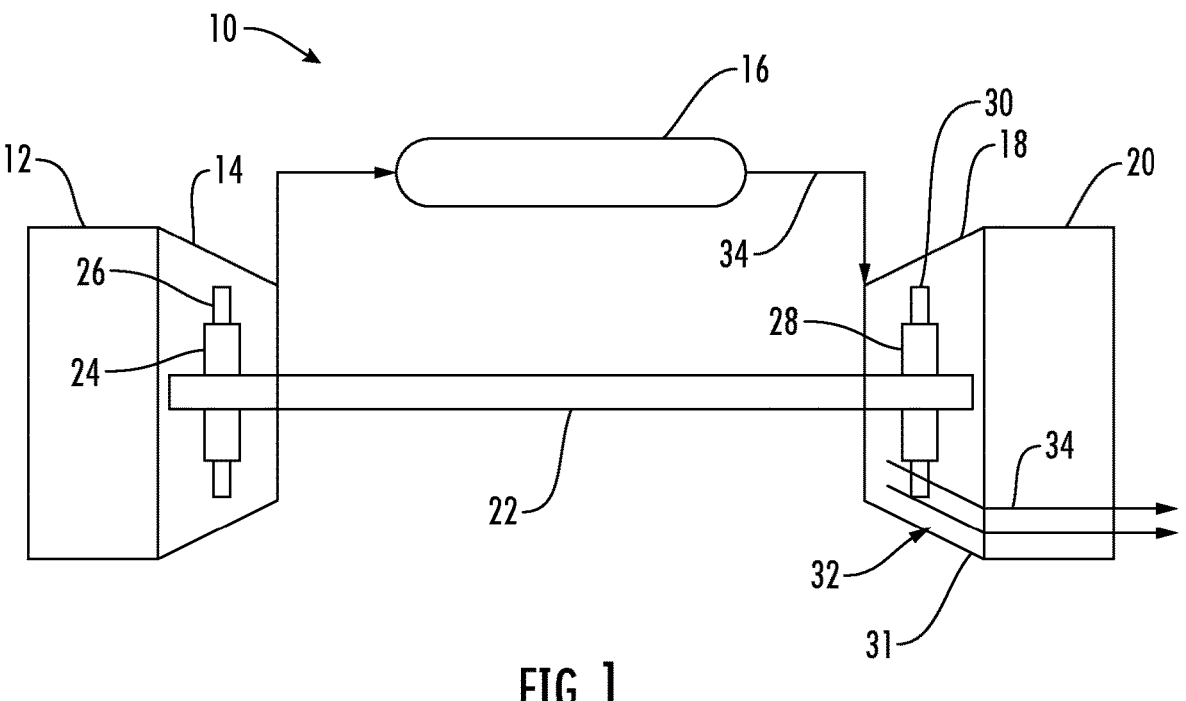
FIG. 1 is a schematic illustration of a turbomachine in accordance with embodiments of the present disclosure.

Reference now will be made in detail to embodiments of the present methods, one or more examples of which are illustrated in the drawings. Each example is provided by way of explanation, rather than limitation of, the technology. In fact, it will be apparent to those skilled in the art that modifications and variations can be made in the present technology without departing from the scope or spirit of the claimed technology. For instance, features illustrated or described as part of one embodiment can be used with another embodiment to yield a still further embodiment. Thus, it is intended that the present disclosure covers such modifications and variations as come within the scope of the appended claims and their equivalents.

The word "exemplary" is used herein to mean "serving as an example, instance, or illustration." Any implementation described herein as "exemplary" is not necessarily to be construed as preferred or advantageous over other implementations. Additionally, unless specifically identified otherwise, all embodiments described herein should be considered exemplary.

The detailed description uses numerical and letter designations to refer to features in the drawings. Like or similar designations in the drawings and description have been used to refer to like or similar parts of the invention. As used herein, the terms "first", "second", and "third" may be used interchangeably to distinguish one component from another and are not intended to signify location or importance of the individual components.

The term "fluid" may be a gas or a liquid. The term "fluid communication" means that a fluid is capable of making the connection between the areas specified.

As used herein, the terms "upstream" (or "forward") and "downstream" (or "aft") refer to the relative direction with respect to fluid flow in a fluid pathway. For example, "upstream" refers to the direction from which the fluid flows, and "downstream" refers to the direction to which the fluid flows. However, the terms "upstream" and "downstream" as used herein may also refer to a flow of electricity. The term "radially" refers to the relative direction that is substantially perpendicular to an axial centerline of a particular component, the term "axially" refers to the relative direction that is substantially parallel and/or coaxially aligned to an axial centerline of a particular component and the term "circumferentially" refers to the relative direction that extends around the axial centerline of a particular component.

Terms of approximation, such as "about," "approximately," "generally," and "substantially," are not to be limited to the precise value specified. In at least some instances, the approximating language may correspond to the precision of an instrument for measuring the value, or the precision of the methods or machines for constructing or manufacturing the components and/or systems. In at least some instances, the approximating language may correspond to the precision of an instrument for measuring the value, or the precision of the methods or machines for constructing or manufacturing the components and/or systems. For example, the approximating language may refer to being within a 1, 2, 4, 5, 10, 15, or 20 percent margin in either individual values, range(s) of values and/or endpoints defining range(s) of values. When used in the context of an angle or direction, such terms include within ten degrees greater or less than the stated angle or direction. For example, "generally vertical" includes directions within ten degrees of vertical in any direction, e.g., clockwise or counter-clockwise.

The terms "coupled," "fixed," "attached to," and the like refer to both direct coupling, fixing, or attaching, as well as indirect coupling, fixing, or attaching through one or more intermediate components or features, unless otherwise specified herein. As used herein, the terms "comprises," "comprising," "includes," "including," "has," "having" or any other variation thereof, are intended to cover a non-exclusive inclusion. For example, a process, method, article, or apparatus that comprises a list of features is not necessarily limited only to those features but may include other features not expressly listed or inherent to such process, method, article, or apparatus. Further, unless expressly stated to the contrary, "or" refers to an inclusive- or and not to an exclusive- or. For example, a condition A or B is satisfied by any one of the following: A is true (or present) and B is false (or not present), A is false (or not present) and B is true (or present), and both A and B are true (or present).

Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

Referring now to the drawings, FIG. 1 illustrates a schematic diagram of one embodiment of a turbomachine, which in the illustrated embodiment is a gas turbine 10. Although an industrial or land-based gas turbine is shown and described herein, the present disclosure is not limited to a land-based and/or industrial gas turbine, unless otherwise specified in the claims. For example, the rotor blade as described herein may be used in any type of turbomachine including, but not limited to, a steam turbine, an aircraft gas turbine, or a marine gas turbine.

As shown, the gas turbine 10 generally includes an inlet section 12, a compressor section 14 disposed downstream of the inlet section 12, a plurality of combustors (not shown) within a combustor section 16 disposed downstream of the compressor section 14, a turbine section 18 disposed downstream of the combustor section 16, and an exhaust section 20 disposed downstream of the turbine section 18. Additionally, the gas turbine 10 may include one or more shafts 22 coupled between the compressor section 14 and the turbine section 18.

The compressor section 14 may generally include a plurality of rotor disks 24 (one of which is shown) and a plurality of rotor blades 26 extending radially outwardly from and connected to each rotor disk 24. Each rotor disk 24 in turn may be coupled to or form a portion of the shaft 22 that extends through the compressor section 14.

The turbine section 18 may generally include a plurality of rotor disks 28 (one of which is shown) and a plurality of rotor blades 30 extending radially outwardly from and being interconnected to each rotor disk 28. Each rotor disk 28 in turn may be coupled to or form a portion of the shaft 22 that extends through the turbine section 18. The turbine section 18 further includes an outer casing 31 that circumferentially surrounds the portion of the shaft 22 and the rotor blades 30, thereby at least partially defining a hot gas path 32 through the turbine section 18.

During operation, a working fluid such as air flows through the inlet section 12 and into the compressor section 14 where the air is progressively compressed, thus providing pressurized air to the combustors of the combustor section 16. The pressurized air is mixed with fuel and burned within each combustor to produce combustion gases 34. The combustion gases 34 flow through the hot gas path 32 from the combustor section 16 into the turbine section 18, wherein energy (kinetic and/or thermal) is transferred from the combustion gases 34 to the rotor blades 30, causing the shaft 22 to rotate. The mechanical rotational energy may then be used to power the compressor section 14 and/or to generate electricity. The combustion gases 34 exiting the turbine section 18 may then be exhausted from the gas turbine 10 via the exhaust section 20.

Figure 2:
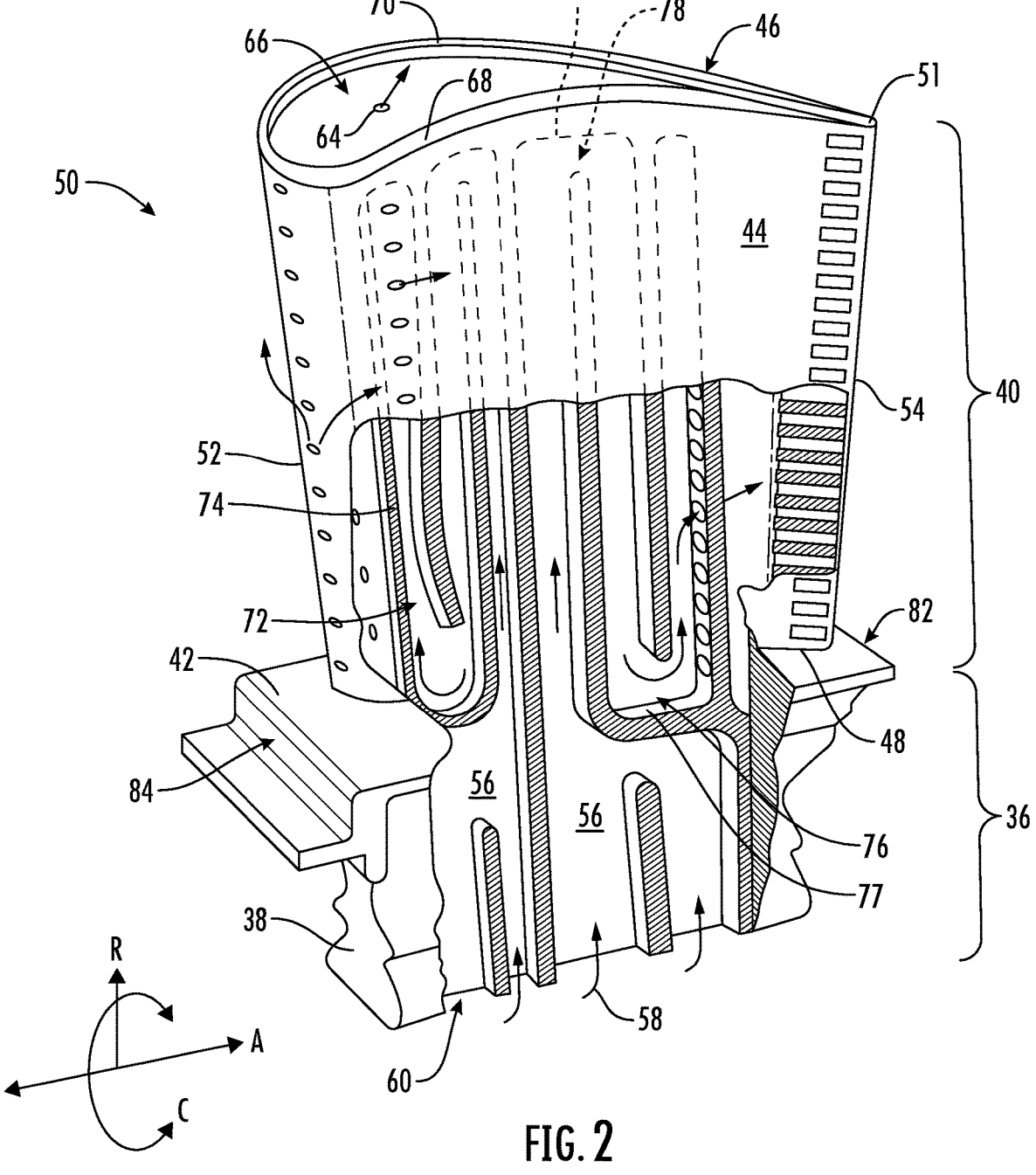
FIG. 2 illustrates a partial cross section view of a rotor blade in accordance with an exemplary aspect of the present disclosure.

As may be seen in FIG. 2, the turbomachine 10 may define an axial direction A and a circumferential direction C, which extends around the axial direction A. The turbomachine 10 may also define a radial direction R perpendicular to the axial direction A.

FIG. 2 provides a perspective view of an exemplary rotor blade 50. The rotor blade 50 may be the rotor blade 26 or the rotor blade 28 described above with reference to FIG. 1. As shown in FIG. 2, the rotor blade 50 generally includes a mounting or shank portion 36 having a mounting portion or dovetail 38 and an airfoil 40 that extends outwardly, e.g., generally along the radial direction R, from a substantially planar platform 42. The platform 42 generally serves as the radially inward boundary for the hot gases of combustion 34 flowing through the hot gas path 32 of the turbine section 18 (FIG. 1). The platform 42 extends along the axial direction A from a leading face 84 to a trailing face 82. As shown in FIG. 2, the mounting portion 38 of the mounting or shank portion 36 may extend radially inwardly from the platform 42 and may include a root structure, such as a dovetail, configured to interconnect or secure the rotor blade 50 to a rotor disk 28 (FIG. 1). The mounting portion 38 may further define a root face 86, which may be the radially innermost surface of the rotor blade 50. The root face 86 may be generally planar (i.e., flat), and one or more cooling passage inlets 60 may be defined within the root face 86.

The airfoil 40 includes a pressure side wall 44 and an opposing suction side wall 46. The pressure side wall 44 and the suction side wall 46 extend substantially radially outwardly from the platform 42 in span from a root 48 of the airfoil 40, which may be defined at an intersection between the airfoil 40 and the platform 42, to a tip 51 of the airfoil 40. The pressure side wall 44 is connected to the suction side wall 46 at a leading edge 52 of the airfoil 40 and a trailing edge 54 downstream of the leading edge 52, and the airfoil 40 thus extends between the leading edge 52 and the trailing edge 54. The pressure side wall 44 generally comprises an aerodynamic, concave external surface of the airfoil 40. Similarly, the suction side wall 46 may generally define an aerodynamic, convex external surface of the airfoil 40. The tip 51 is disposed radially opposite the root 48. As such, the tip 51 may generally define the radially outermost portion of the rotor blade 50 and, thus, may be configured to be positioned adjacent to a stationary shroud or seal (not shown) of the turbomachine 10. The tip 51 may include a tip cavity 66.

As shown in FIG. 2, the rotor blade 50 may be at least partially hollow, e.g., the rotor blade 50 may include a cooling circuit 72 defined therein. The cooling circuit 72 may include a plurality of cooling passages 56 (shown partially in dashed lines in FIG. 2), which may be circumscribed within the rotor blade 50 for routing a coolant 58 through the airfoil 40 between the pressure side wall 44 and the suction side wall 46, thus providing convective cooling thereto. The cooling passages 56 may be at least partially defined by and between a plurality of ribs 74. The ribs 74 extend partially through the cooling circuit 72 generally along the radial direction R, e.g., as illustrated in FIG. 2. The ribs 74 may extend fully through the cooling circuit 72 between the pressure side wall 44 and the suction side wall 46, e.g., as illustrated in FIG. 6. The plurality of ribs 74 may thereby partition the cooling circuit 72 and at least partially form or define the cooling passages 56. For example, each rib 74 may radially terminate near one of a root turn 76 or a tip turn 78. The root turn 76 may be partially defined by a floor 77, which defines the radially inward most boundary of the root turn 76. Similarly, the tip turn 78 may be partially defined by a ceiling 79, which may define the radially outermost boundary of the tip turn 78.

The coolant 58 may include a portion of the compressed air from the compressor section 14 (FIG. 1) and/or steam or any other suitable gas or other fluid for cooling the airfoil 40. One or more cooling passage inlets 60 are disposed along the rotor blade 50. In some embodiments, one or more cooling passage inlets 60 are formed within, along or by the mounting portion 38. The cooling passage inlets 60 are in fluid communication with at least one corresponding cooling passage 56. A plurality of coolant outlets 64 may be in fluid communication with the tip cavity 66. Each cooling passage 56 is in fluid communication with at least one of the coolant outlets 64. In some embodiments, the tip cavity 66 may be at least partially surrounded by a pressure side tip rail 68 and a suction side tip rail 70.

As may be seen in FIG. 2, the cooling passages 56 extend within each of the shank portion 36 and the airfoil portion 40. For example, the cooling passages 56 may extend between the shank portion 36 and the airfoil portion 40, e.g., from the shank portion 36 to the airfoil portion 40, such as from the one or more cooling passage inlets 60 in the shank portion 36 to the at least one coolant outlet 64 in the tip 51 of the airfoil portion 40.

In many embodiments, the rotor blade 50 may be composed an anisotropic media (e.g., the rotor blade may be referred to as an "anisotropic rotor blade"), particularly when the rotor blade 50 is used in the turbine section 18 because the anisotropic material allows the rotor blade 50 to withstand greater temperatures/-stresses. Anisotropy is the property of a material which allows it to assume different properties in different directions, as opposed to isotropic materials. Particularly, the rotor blade 50 may be formed from a single crystalline alloy such as nickel-based alloys.

Figure 3:
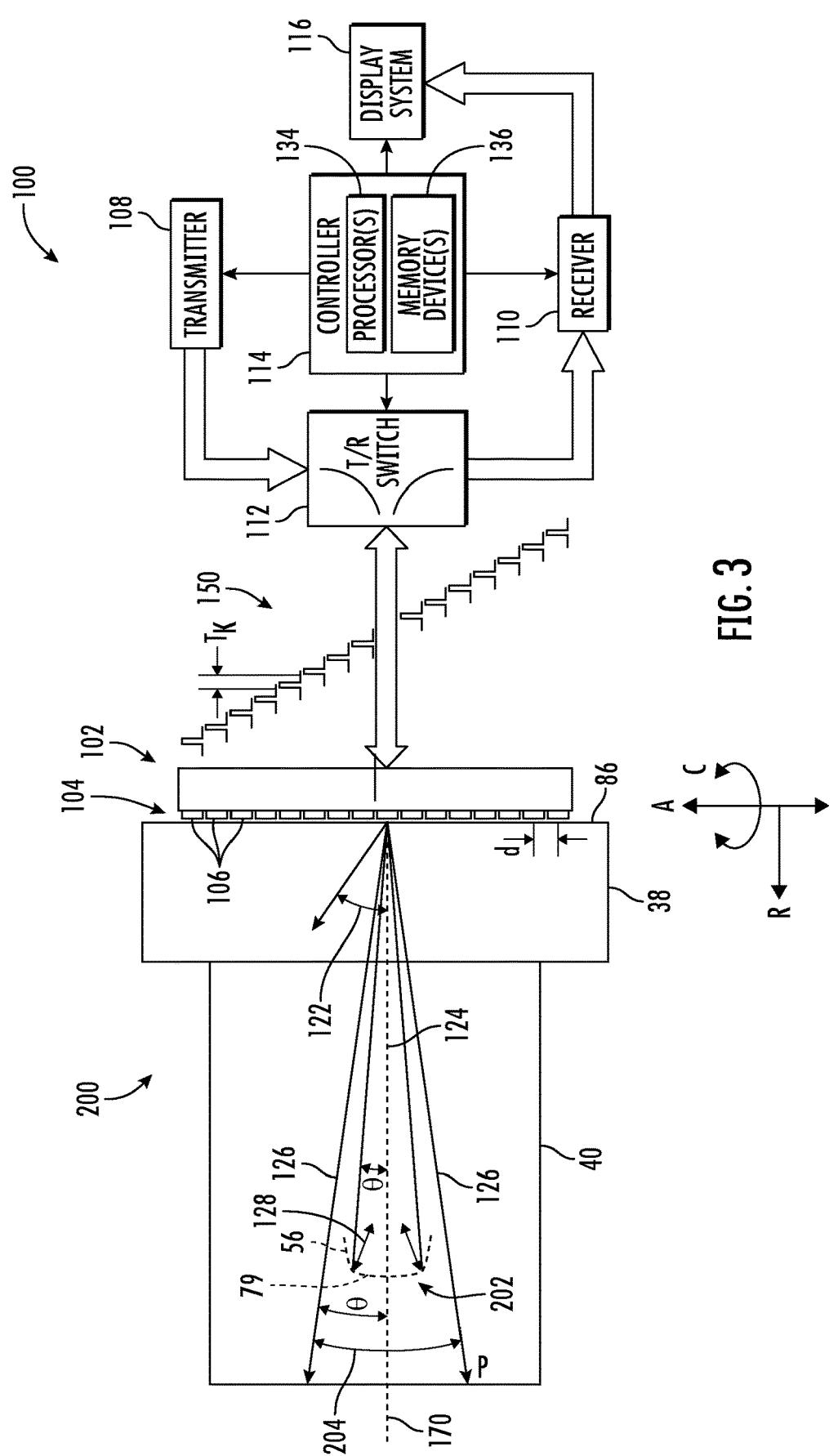
FIG. 3 illustrates a schematic view of a phased array ultrasound system and an anisotropic rotor blade in accordance with embodiments of the present disclosure.

Referring particularly to FIG. 3, a phased array ultrasonic system 100, which may be used for detecting defects in an anisotropic rotor blade 200 is illustrated in accordance with embodiments of the present disclosure. In exemplary implementations of the phased array ultrasonic system 100, the anisotropic rotor blade 200 for the turbine section 18, which may have the same or a similar configuration as the rotor blade 50 described above with reference to FIG. 2. Defects that may be detected by the present phased array ultrasonic system 100 and method are cracks, corrosion, voids, pinholes, air pockets, and others.

The phased array ultrasonic system 100 includes a probe 102 having transducer array 104 comprised of a plurality of separately driven transducer elements or transducers 106 which each produce a burst of ultrasonic energy when energized by a pulse produced by a transmitter 108. The ultrasonic energy reflected back to transducer array 104 from the subject under study is converted to an electrical signal by each transducer element 106 and applied separately to a receiver 110 through a set of switches 112. Transmitter 108, receiver 110 and switches 112 are operated under control of a digital controller 114 (which may be responsive to the commands input by a human operator). A complete scan is performed by acquiring a series of echoes in which transmitter 108 is gated on momentarily to energize each transducer element 106, switches 32 are then gated on to receive the subsequent echo signals produced by each transducer element 106, and these separate echo signals are combined in receiver 110 to produce a single echo signal which is employed to produce a pixel or a line in an image on a display 116.

Transmitter 108 drives the transducer array 104 such that the ultrasonic energy produced is directed, or steered, in a beam. A B-scan can therefore be performed by moving this beam through a set of angles from point-to-point rather than physically moving transducer array 104. To accomplish this, transmitter 108 imparts a time delay $(T_k)$ to the respective pulses 150 that are applied to successive transducer elements 106. If the time delay is zero $(T_k=0)$, all the transducer elements 106 are energized simultaneously and the resulting ultrasonic beam is directed along a central axis 170 normal to the transducer face and originating from the center of transducer array 106. The beam is focused at an infinite range. As the time delay $(T_k)$ is increased, the ultrasonic beam is directed downward from central axis 21 by an amount θ. The relationship between the time delay increment $T_k$ which is added successively to each $k^{th}$ signal from one end of the transducer array (k=1) to the other end (k=N) is given by the following relationship:

$$T_k = \frac{R_0}{c} - \sqrt{\left(\frac{R_0}{c}\right)^2 + \left(\frac{x}{c}\right)^2 - 2 \times R_0 \sin\left(\frac{\theta}{c^2}\right)} \tag{1}$$

Where d is the spacing between centers of adjacent transducer elements 104, c is the velocity of sound in the object under study, $R_0$ is the range at which transmit beam is focused and $T_k$ is the delay offset which insures that all calculated values $(T_k)$ are positive values.

The time delays $T_k$ in equation (1) have the effect of steering the beam in the desired angle θ, and causing it to be focused at a fixed range $R_0$. A sector scan is performed by progressively changing the time delays $T_k$ in successive excitations. The angle θ is thus changed in increments to steer the transmitted beam in a succession of directions, but the focal distance $R_0$ remains fixed. When the direction of the beam is above central axis 21, the timing of pulses 150 is reversed, but the formula of equation (1) still applies. Multiple depths (e.g., multi-depth focusing) may be scanned in succession, and the resulting echoes may be stitched together to form a full sector scan image viewable by the display system 116.

The echo signals produced by each burst of ultrasonic energy emanate from reflecting objects located at successive positions (R) along the ultrasonic beam. These are sensed separately by each transducer element 106 of transducer array 104 and a sample of the magnitude of the echo signal at a particular point in time represents the amount of reflection occurring at a specific range (R). Due to the differences in the propagation paths between a reflecting point P and each transducer element 106, however, these echo signals will not occur simultaneously, and their amplitudes will not be equal. The function of receiver 110 is to amplify and demodulate these separate echo signals, impart the proper time delay and phase shift to each and sum them together to provide a single echo signal which accurately indicates the total ultrasonic energy reflected from point P located at range R along the ultrasonic beam oriented at the angle θ.

To simultaneously sum the electrical signals produced by the echoes from each transducer element 106, time delays and phase shifts are introduced into each separate transducer element channel of receiver 110. The beam time delays for reception are the same delays $(T_k)$ as the transmission delays described above. However, in order to dynamically focus the receive beam, the time delay and phase shift of each receiver channel is continuously changing during reception of the echo to provide dynamic focusing of the received beam at the range R from which the echo signal emanates.

Under the direction of digital controller 114, the receiver 110 provides delays during the scan such that the steering of receiver 110 tracks with the direction of the beam steered by transmitter 108 and it samples the echo signals at a succession of ranges and provides the proper delays and phase shifts to dynamically focus at points P along the beam. Thus, each emission, or firing, of an ultrasonic pulse waveform results in the acquisition of a series of data points which represent the amount (or magnitude) of reflected sound from a corresponding series of points P located along the ultrasonic beam. Display system 116 receives the series of data points produced by receiver 110 and converts the data to a form producing the desired image.

A wave normal direction 124 may extend generally perpendicularly to the face of the transducers 106, which in FIG. 3 coincides or extends coaxially with the axial centerline 170. Unlike isotropic media where group and phase velocities of an acoustic wave coincide with one another, ultrasonic wave propagation in an anisotropic media will not coincide with the wave normal direction 124 unless the propagation direction is along a symmetry axis. This phenomenon is known as energy flux deviation or beam skew. Acoustic energy does not necessarily propagate in the direction normal to the face of the transducers 106 (e.g., the wave normal direction 124) as happens with isotropic media, but will rather be skewed at an oblique angle or anisotropic tilt angle 122 relative to the wave normal.

Particularly, in the anisotropic rotor blade 200, the anisotropic tilt angle 122 may be generally known, but may vary within a range of between about 0° and about 12°, or such as between about 10 and about 10°. For example, the anisotropic tilt angle 122 may be within a range of between about 0° and about 120 from the axial centerline 170, or such as between about 10 and about 100 from the axial centerline 170.

As will be discussed in more detail below, the exemplary method for operating the phased array ultrasonic system 100 advantageously identifies and accounts for the anisotropic tilt angle 122 in the anisotropic rotor blade 200, thereby allowing the anisotropic rotor blade 200 to be scanned for defects without error or ghost echoes (e.g., echoes that appear to indicate defects but are actually internal part geometry). Once the anisotropic tilt angle 122 is determined, the method may account for the angle by rotating the probe 102, the anisotropic rotor blade 200, or by adjusting the delay laws of the system 100 to steer the acoustic waves.

Still referring to FIG. 3, the controller 114 is shown as a block diagram to illustrate the suitable components that may be included within the controller 114. As shown, the controller 114 may include one or more processor(s) 134 and associated memory device(s) 136 configured to perform a variety of computer-implemented functions (e.g., performing the methods, steps, calculations and the like and storing relevant data as disclosed herein).

As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the memory device(s) 136 may generally comprise memory element(s) including, but not limited to, computer readable medium (e.g., random access memory (RAM)), computer readable non-volatile medium (e.g., a flash memory), a floppy disk, a compact disc-read only memory (CD-ROM), a magneto-optical disk (MOD), a digital versatile disc (DVD) and/or other suitable memory elements. Such memory device(s) 136 may generally be configured to store suitable computer-readable instructions that, when implemented by the processor(s) 134, configure the controller 114 to perform various functions and/or operations.

Additionally, in many embodiments, the probe 102 may be in wireless communication with the digital controller 114 (via any suitable wireless communication protocol). Int this way, the probe 102 may transmit the magnitude and/or time delay of the echo signals 128, and the digital controller 114 may analyze these echo signals 128 and generate one or more adjustments to the delay laws of the probe 102. The adjustments to the delay laws may be made wirelessly.

Referring now to FIGS. 4 and 5, a flow diagram two different embodiments of a method 400, 500 for detecting defects in an anisotropic rotor blade using a phased array ultrasonic system are illustrated in accordance with aspects of the present subject matter. In general, the methods 400 and 500 will be described herein with reference to the phased array ultrasound system 100, the gas turbine 10, the anisotropic rotor blade 200, and the rotor blade 50 described above with reference to FIGS. 1 through 3. However, it will be appreciated by those of ordinary skill in the art that the disclosed methods 400 and 500 may generally be utilized with any suitable phased array ultrasound system 100 and/or may be utilized in connection with a system having any other suitable system configuration. In addition, although FIGS. 4 and 5 depicts steps performed in a particular order for purposes of illustration and discussion, the methods discussed herein are not limited to any particular order or arrangement unless otherwise specified in the claims. One skilled in the art, using the disclosures provided herein, will appreciate that various steps of the methods disclosed herein can be omitted, rearranged, combined, and/or adapted in various ways without deviating from the scope of the present disclosure.

In exemplary implementations, the anisotropic rotor blade 200 for the turbine section 18, which may have the same or a similar configuration as the rotor blade 50 described above with reference to FIG. 2. In such embodiments, as shown in FIG. 3, the anisotropic rotor blade 200 may extend along an axial centerline 170 and include a mounting portion 38 and an airfoil 40. A cooling passage 56, such as the cooling passage 56 shown and described above with reference to FIG. 2, may be defined within the anisotropic rotor blade 200 at least partially along the axial centerline 170. The cooling passage 56 may be at least partially defined by a ceiling 79, which may form the radially outermost boundary of the cooling passage 56 (as shown in FIG. 2).

Referring specifically to FIG. 4, the method 400 may include at (402) positioning a probe 102 of the phased array ultrasound system 100 on the mounting portion 38 of the anisotropic rotor blade 200 at the axial centerline 170. For example, the probe 102 may be positioned in contact with the mounting portion 38 of the anisotropic rotor blade 200. Particularly, the mounting portion 38 may include a root face 86. The root face 86 may be a generally planar (e.g., flat) surface. In such embodiments, the method 400 may include the probe 102 of a phased array ultrasound system 100 on the root face 86 of the anisotropic rotor blade 200 at the axial centerline 170. Specifically, as shown in FIG. 3, as an initial step of the method 400, the transducer array 104, including each transducer of the plurality of transducers 106, may be positioned in contact with the root face 86 of the anisotropic rotor blade 200 at least partially along an axial centerline 170 of the anisotropic rotor blade (e.g., centered on the axial centerline in some embodiments).

The method 400 may further include at (404) scanning a sector 204 of the anisotropic rotor blade 200 along the axial centerline 170 with the probe 102 of the phased array ultrasound system 100. Scanning the sector 204 (i.e., performing a sector scan with the system 100) may include progressively changing the time delays $T_k$ in successive excitations of the plurality of transducers 106. The angle θ is thus changed in increments to steer the transmitted beam 126 in a succession of directions. When the direction of the beam is above central axis 21, the timing of pulses 150 is reversed. In some embodiments, the sector scan may be at a fixed focal depth P. In other embodiments, the sector scan may include a multi-focal depth by successively targeting different depths and stitching together the resulting image with the display system 116.

In many embodiments, scanning the sector at (404) may include transmitting, with the plurality of transducers 106 of the probe 102, a plurality of ultrasonic beams 126 at varying angles θ (and varying focal depths) into the anisotropic rotor blade 200. For example, scanning the sector at (404) may include transmitting, with the plurality of transducers 106 of the probe 102, a plurality of ultrasonic beams 126 at varying depths into the anisotropic rotor blade 200, the depths being defined by pre-set region of interest. Particularly, the depths may correspond with various span lengths of the airfoil 40 (such as between about 0% and about 100% span of the airfoil 40). The regions of interest may be areas of the anisotropic rotor blade 200 that are prone to failures, such as one or more of the cooling channels or passages.

The angles θ may be defined between the respective transmitted ultrasonic beam 126 and a wave normal direction 124 that is perpendicular to the plurality of transducers 106. In exemplary implementations, the plurality of angles varying from between about −5° and about 5°, or such as between about −4° and about 4°. In this way, the sector 204 that is scanned may be defined between the two outermost angle values (e.g., −5° and 5°). The focal depth (illustrated as "P" in FIG. 3) of the sector scan may also vary, such that the sector scan includes a range of focal depths P (which may be stitched together in a single image by the display system 116). The range of focal depths P may be between about 0% and about 100% of the length of the anisotropic rotor blade 200 (measured in a direction parallel to the axial centerline 170). In other embodiments, the range of focal depths P may be between about 25% and about 75% of the length of the anisotropic rotor blade 200.

In various implementations, the scanning the sector at (404) may include simultaneous multi-depth and multi-angle focusing of acoustic waves into the anisotropic blade. For example, multiple depths (e.g., the distance the beam 126 travels into the rotor blade 200, which is illustrated in FIG. 3 as "P") and multiple angles θ of beams 126 (or acoustic waves) may be transmitted simultaneously by the probe 102 (e.g., via the plurality of transducers).

In many embodiments, a geometric fiducial marker 202 may be disposed at least partially within the sector 204. The geometric fiducial marker 202 may be an identifiable or known (e.g., by the digital controller 114) geometric feature of the anisotropic rotor blade 200. For example, the geometric fiducial marker 202 may include an interior/exterior contour, a cooling hole, or other geometric feature of the anisotropic rotor blade 200. In exemplary embodiments, the geometric fiducial marker 202 is the ceiling 79 of the cooling passage 56 defined within the airfoil 40 of the anisotropic rotor blade 200. As shown in FIG. 3, the cooling passage 56 may be at least partially disposed along the axial centerline 170.

In exemplary implementations, the method 400 may include at (406) determining (e.g., with the digital controller) a magnitude and a time delay of the echo signals 128 corresponding with the geometric fiducial marker 202. For example, the echo signals 128 may be the transmitted beams 126 that have reflected from the geometric fiducial marker 202. The magnitude of the echo signals 128 may be based on the strength of the echo signal 128. The time delay may be the time taken for the echo signal 128 to reach the transducer elements 106. The magnitude and/or the time delay of the echo signals 128 may be compared to a predetermined maximum echo, and if the magnitude and/or the time delay of the echo signal falls outside of the predetermined maximum echo range, then a position of the anisotropic rotor blade 200 and/or the probe 102 may be adjusted to account for the anisotropic tilt angle 122.

For example, the method 400 may further include at (408) adjusting a position of one of the anisotropic rotor blade 200 or the probe based on the magnitude (and/or the time delay) of the echo signal 128 corresponding with the geometric fiducial marker 202. Particularly, the magnitude of the echo signal 128 may be compared (e.g., by the digital controller 114) to the predetermined maximum echo range, and based on the extent that the magnitude of the echo signal falls outside of the predetermined maximum echo range, the position of one of the anisotropic rotor blade 200 or the probe 102 is modified. Similarly, the time delay of the echo signal 128 (e.g., the time it takes for the echo signal 128 to be received by the transducer element) may be compared to a predetermined maximum echo range, and based on the extent that the time delay of the echo signal falls outside the predetermined maximum range, the position of the anisotropic rotor blade 200 and/or the probe 102 may be modified. The predetermined maximum echo range may include a predetermined range for both magnitude and time delay. As a non-limiting example, if the magnitude (and/or the time delay) of the echo signal 128 is 5% outside of the predetermined maximum echo range, then the probe 102 and/or the anisotropic rotor blade 200 may be rotated and/or translated by 1%. Alternatively, or additionally, the magnitude (and/or the time delay) of the echo signal 128 may correspond with a rotation and/or translation adjustment in a look up table stored within the memory 136 of the controller 114. For example, based on the magnitude (and/or the time delay) of the echo signal 128, the controller 114 may consult the look up table and suggest a rotation and/or translation of the probe 102 and/or the rotor blade 200. Adjusting a position of the probe 102 and/or the rotor blade 200 may include rotating and/or translating the probe 102 and/or the rotor blade 200 (e.g., along or about any of the axial direction A, the radial direction R, or the circumferential direction C).

The scanning, determining, and adjusting steps shown in (404), (406), and (408) shown in FIG. 4 and described above may be iterative. Such that the steps may be repeated to iteratively increase the magnitude and/or the time delay of the echo signal 128 until the magnitude of the echo signal and its time delay is within the predetermined maximum echo range, thereby indicating that the anisotropic tilt angle 122 has been accounted for. For example, the predetermined maximum echo range may be the range of echo magnitudes and/or time delays that occur when the anisotropic tilt is accounted for, or when the anisotropic tilt is 0°, such that the maximum amount of beams 126 are reflecting off of the geometric fiducial marker 202. As such, when the magnitude and/or the time delay of the echo signal is within the predetermined maximum echo range, this indicates that the anisotropic tilt angle 122 has been accounted for (e.g., by physically rotating/translating the rotor blade 200 and/or the probe 102). For example, the method 400 may include at (410) repeating the scanning, determining, and adjusting steps (e.g., steps 404, 406, and 408) until the magnitude and/or the time delay of the echo signals 128 corresponding with the geometric fiducial marker 202 are within the predetermined maximum echo range (e.g., the echo magnitude and its time delay does not exceed or fall below the range).

Finally, once the rotor blade 200 and/or the probe 102 has been physically adjusted, such that scanning the rotor blade accounts for the anisotropic tilt angle 122, the method 400 may include at (412) scanning the anisotropic rotor blade for defects. The defects that may be detected by the present phased array ultrasonic system 100 and method are cracks, corrosion, voids, pin-holes, air pockets, and others.

In many embodiments, scanning the sector 204 at (404) may include transmitting, with the plurality of transducers, a plurality of ultrasonic beams 126 into the anisotropic rotor blade 200 along an inspection plane (e.g., the plane of the page in FIG. 3 or another two dimensional plane). In such embodiments, the probe 102 may include a linear array (e.g., a single row) of transducers 106, such that the sector 204 is within a two dimensional inspection plane. As a result of the anisotropic media of the rotor blade, the ultrasonic beams 126 may deviate from the inspection plane at the anisotropic tilt angle 122 while propagating through the anisotropic rotor blade 200. The anisotropic tilt angle 122 may be associated with the anisotropic rotor blade 200. The anisotropic tilt angle 122 may be generally known, but may vary within a range of between about 0° and about 12°, or such as between about 10 and about 100 from blade to blade. As such, the anisotropic tilt angle 122 must be determined and accounted for to increase the accuracy and effectiveness of the phased array ultrasonic system 100. In such embodiments, the method may include receiving, with the plurality of transducers 106, the echo signal corresponding with the geometric fiducial marker 202. The magnitude of the echo signal and its time delay received by the plurality of transducers 106 is related to a magnitude of the anisotropic tilt angle. For example, the magnitude and time delay of the echo signal may be related based on historical data (which may be stored in the memory of the controller 114), or based on a look up table, or based on another correlation.

In many embodiments, the method 400 may include determining the anisotropic tilt angle 122 by repeating the scanning, determining, and adjusting steps (e.g., steps 404, 406, and 408) until the magnitude and/or the time delay of the echo signal 128 corresponding with the geometric fiducial marker 202 is within the predetermined maximum echo range. For example, the predetermined maximum echo range may be the range of echo magnitudes and/or time delays that occur when the anisotropic tilt is accounted for, or when the anisotropic tilt is 0°, such that the maximum amount of beams 126 are reflecting off of the geometric fiducial marker 202. As such, when the magnitude and/or the time delay of the echo signal is within the predetermined maximum echo range, this indicates that the anisotropic tilt angle 122 has been accounted for (e.g., by physically rotating/translating the rotor blade 200 and/or the probe 102). Once the anisotropic tilt angle 122 is accounted for, it may be determined by the controller 114 (e.g., based on the movements/adjustments made to the rotor blade 200 and/or the probe 102, or based on the adjustments made to the delay profile). In such embodiments, after the anisotropic tilt angle is determined, the method may further include adjusting a position of anisotropic rotor blade 200 and/or the probe 102 a final instance based on the determined anisotropic tilt angle 122 and scanning the anisotropic rotor blade 200 for defects.

In many embodiments, after scanning the part for defects a first time, the method may include translating the probe 102 away from the axial centerline 170 of the rotor blade and along the mounting portion 38. Subsequently, the method may include scanning the anisotropic rotor blade for defects a second time with the phased array ultrasound system 100. For example, once the anisotropic tilt angle 122 is identified and accounted for, the probe 102 may be translated along the root face 86 for scanning multiple portions of the anisotropic rotor blade 200 for defects.

Referring specifically to FIG. 5, the method 500 may include at (502) positioning a probe 102 of the phased array ultrasound system 100 on the mounting portion 38 of the anisotropic rotor blade 200 at the axial centerline 170. For example, the probe 102 may be positioned in contact with the mounting portion 38 of the anisotropic rotor blade 200. Particularly, the mounting portion 38 may include a root face 86. The root face 86 may be a generally planar (e.g., flat) surface. In such embodiments, the method 500 may include the probe 102 of a phased array ultrasound system 100 on the root face 86 of the anisotropic rotor blade 200 at the axial centerline 170. Specifically, as shown in FIG. 3, as an initial step of the method 500, the transducer array 104, including each transducer of the plurality of transducers 106, may be positioned in contact with the root face 86 of the anisotropic rotor blade 200 at least partially along an axial centerline 170 of the anisotropic rotor blade (e.g., centered on the axial centerline in some embodiments).

The method 500 may further include at (504) scanning a sector 204 of the anisotropic rotor blade 200 along the axial centerline 170 with the probe 102 of the phased array ultrasound system 100. Scanning the sector 204 (i.e., performing a sector scan with the system 100) may include progressively changing the time delays $T_k$ in successive excitations of the plurality of transducers 106. The angle $\theta$ is thus changed in increments to steer the transmitted beam 126 in a succession of directions. When the direction of the beam is above central axis 21, the timing of pulses 150 is reversed. In some embodiments, the sector scan may be at a fixed focal depth P. In other embodiments, the sector scan may include a multi-focal depth by successively targeting different depths and stitching together the resulting image with the display system 116.

In many embodiments, scanning the sector at (504) may include transmitting, with the plurality of transducer elements 106 of the probe 102, a plurality of ultrasonic beams 126 at varying angles $\theta$ (and varying depths) into the anisotropic rotor blade 200. The angles $\theta$ may be defined between the respective transmitted ultrasonic beam 126 and a wave normal direction 124 that is perpendicular to the plurality of transducer elements 106. In exemplary implementations, the plurality of angles varying from between about −5° and about 5°, or such as between about −4° and about 4°. In this way, the sector 204 that is scanned may be defined between the two outermost angle values (e.g., −5° and 5°). The focal depth (illustrated as "P" in FIG. 3) of the sector scan may also vary, such that the sector scan includes a range of focal depths P (which may be stitched together in a single image by the display system 116). The range of focal depths P may be between about 0% and about 100% of the length of the anisotropic rotor blade 200 (measured in a direction parallel to the axial centerline 170). In other embodiments, the range of focal depths P may be between about 25% and about 75% of the length of the anisotropic rotor blade 200.

In many embodiments, a geometric fiducial marker 202 may be disposed at least partially within the sector 204. The geometric fiducial marker 202 may be an identifiable or known (e.g., by the digital controller 114) geometric feature of the anisotropic rotor blade 200. For example, the geometric fiducial marker 202 may include an interior/exterior contour, a cooling hole, or other geometric feature of the anisotropic rotor blade 200. In exemplary embodiments, the geometric fiducial marker 202 is the ceiling 79 of the cooling passage 56 defined within the airfoil 40 of the anisotropic rotor blade 200. As shown in FIG. 3, the cooling passage 56 may be at least partially disposed along the axial centerline 170.

In exemplary implementations, the method 500 may include at (506) determining (e.g., with the digital controller) a magnitude and a time delay of echo signals 128 corresponding with the geometric fiducial marker 202. For example, the echo signals 128 may be the transmitted beams 126 that have reflected from the geometric fiducial marker 202. The magnitude of the echo signals 128 may be based on the strength of the echo signal 128. The time delay may be the time taken for the echo signal 128 to reach the transducer elements 106. The magnitude of the echo signals 128 and/or the time delay of the echo signals 128 may be compared to a predetermined maximum echo range, and if the magnitude and/time delay of the echo signal falls outside of the predetermined maximum echo range, then delay laws of the probe 102 may be adjusted to steer the beams 126 and account for the anisotropic tilt angle 122. Similarly, the time delay of the echo signal 128 (e.g., the time it takes for the echo signal 128 to be received by the transducer element) may be compared to a predetermined maximum echo range, and based on the extent that the time delay of the echo signal falls outside the predetermined maximum range, then delay laws of the probe 102 may be adjusted to steer the beams 126 and account for the anisotropic tilt angle 122.

For example, the method 500 may further include at (508) adjusting delay laws of the probe 102 based on the magnitude and/or the time delay of the echo signal 128 corresponding with the geometric fiducial marker 202. The delays ($T_k$) between each of the pulses 150 may be referred to as the "delay laws." The delays ($T_k$) between each pulse 150 may be independently adjusted or manipulated to steer or direct the beam 126 along a desired path. Accordingly, adjusting the delay laws makes an adjustment to the path along which the beam 126 travels, such that the anisotropic tilt angle 122 may be accounted for once identified.

Particularly, the magnitude and/or the time delay of the echo signal 128 may be compared (e.g., by the digital controller 114) to the predetermined maximum echo range, and based on the extent that the magnitude and delay of the echo signal 128 falls outside of the predetermined maximum echo range, the delay laws may be adjusted. As a non-limiting example, if the magnitude (and/or the time delay) of the echo signal 128 is 5% outside of the predetermined maximum echo range, then the delay laws may be adjusted (e.g., increased or decreased) by 1%. Alternatively, or additionally, the magnitude (and/or time delay) of the echo signal 128 may correspond with a delay law adjustment in a look up table stored within the memory 136 of the controller 114. For example, based on the magnitude (and/or time delay) of the echo signal 128, the controller 114 may consult the look up table and suggest a delay law adjustment to the probe 102 and/or the rotor blade 200.

The scanning, determining, and adjusting steps shown in (504), (506), and (508) shown in FIG. 5 and described above may be iterative and optimized algorithmically. Such that the steps may be repeated to iteratively increase the magnitude (and/or the time delay) of the echo signal 128 until the magnitude (and/or the time delay) of the echo signal is within the predetermined maximum echo range, thereby indicating that the anisotropic tilt angle 122 has been accounted for. For example, the predetermined maximum echo range may be the range of echo magnitudes that occur when the anisotropic tilt is accounted for, or when the anisotropic tilt is 0°, such that the maximum amount of beams 126 are reflecting off of the geometric fiducial marker 202. As such, when the magnitude (and/or the time delay) of the echo signal is within the predetermined maximum echo range, this indicates that the anisotropic tilt angle 122 has been accounted for (e.g., by the adjustments made to the delay laws). For example, the method 500 may include at (510) repeating the scanning, determining, and adjusting steps (e.g., steps 504, 506, and 508) until the magnitude and delay of the echo signals 128 corresponding with the geometric fiducial marker 202 are within the predetermined maximum echo range (e.g., the magnitude and/or time delay does not exceed or fall below the range).

Finally, once the delay laws have been adjusted, such that scanning the rotor blade accounts for the anisotropic tilt angle 122, the method 500 may include at (512) scanning the anisotropic rotor blade for defects. The defects that may be detected by the present phased array ultrasonic system 100 and method are cracks, corrosion, voids, pin-holes, air pockets, and others.

In many embodiments, scanning the sector 204 at (504) may include transmitting, with the plurality of transducers, a plurality of ultrasonic beams 126 into the anisotropic rotor blade 200 along an inspection plane (e.g., the plane of the page in FIG. 3 or another two dimensional plane). In such embodiments, the probe 102 may include a linear array (e.g., a single row) of transducers 106, such that the sector 204 is within a two dimensional inspection plane. As a result of the anisotropic media of the rotor blade, the ultrasonic beams 126 may deviate from the inspection plane at the anisotropic tilt angle 122 while propagating through the anisotropic rotor blade 200. The anisotropic tilt angle 122 may be associated with the anisotropic rotor blade 200. The anisotropic tilt angle 122 may be generally known, but may vary within a range of between about 0° and about 12°, or such as between about 1° and about 10° from blade to blade. As such, the anisotropic tilt angle 122 must be determined and accounted for to increase the accuracy and effectiveness of the phased array ultrasonic system 100. In such embodiments, the method may include receiving, with the plurality of transducers 106, the echo signal 128 corresponding with the geometric fiducial marker 202. The magnitude and delay of the echo signal 128 received by the plurality of transducers 106 is related to a magnitude of the anisotropic tilt angle. For example, the magnitude and time delay of the echo signal may be related based on historical data (which may be stored in the memory of the controller 114), or based on a look up table, or based on another correlation.

In many embodiments, the method 500 may include determining the anisotropic tilt angle 122 by repeating the scanning, determining, and adjusting steps (e.g., steps 504, 506, and 508) until the magnitude and delay of the echo signal 128 corresponding with the geometric fiducial marker 202 is within the predetermined maximum echo range. For example, the predetermined maximum echo range may be the range of echo magnitudes and/or time delays that occur when the anisotropic tilt is accounted for, or when the anisotropic tilt is 0°, such that the maximum amount of beams 126 are reflecting off of the geometric fiducial marker 202. As such, when the magnitude and/or the time delay of the echo signal is within the predetermined maximum echo range, this indicates that the anisotropic tilt angle 122 has been accounted (e.g., by altering or adjusting the delay laws). Once the anisotropic tilt angle 122 is accounted for, it may be determined by the controller 114 (e.g., based on the adjustments made to the delay laws). In such embodiments, after the anisotropic tilt angle is determined, the method may further include adjusting the delay laws a final instance based on the determined anisotropic tilt angle 122 and scanning the anisotropic rotor blade 200 for defects.

In many embodiments, after scanning the part for defects a first time, the method may include translating the probe 102 away from the axial centerline 170 of the rotor blade and along the mounting portion 38. Subsequently, the method may include scanning the anisotropic rotor blade for defects a second time with the phased array ultrasound system 100. For example, once the anisotropic tilt angle 122 is identified and accounted for, the probe 102 may be translated along the root face 86 for scanning multiple portions of the anisotropic rotor blade 200 for defects.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

Further aspects of the invention are provided by the subject matter of the following clauses:

A method for detecting defects in an anisotropic rotor blade using a phased array ultrasound system, the anisotropic rotor blade extending along an axial centerline and comprising a mounting portion and an airfoil, the method comprising: positioning a probe of the phased array ultrasound system on the mounting portion of the anisotropic rotor blade at the axial centerline; scanning a sector of the anisotropic rotor blade along the axial centerline with the probe of the phased array ultrasound system, a geometric fiducial marker disposed at least partially within the sector of the anisotropic rotor blade; determining a magnitude and a time delay of an echo signal corresponding with the geometric fiducial marker; adjusting a position of one of the anisotropic rotor blade or the probe based on the magnitude of the echo signal corresponding with the geometric fiducial marker; and repeating the scanning, determining, and adjusting steps until the magnitude and the time delay of the echo signal corresponding with the geometric fiducial marker is within a predetermined maximum echo range; and scanning the anisotropic rotor blade for defects.

The method as in any of the preceding clauses, wherein scanning a sector of the anisotropic rotor blade comprises: transmitting, with a plurality of transducers, a plurality of ultrasonic beams into the anisotropic rotor blade along an inspection plane, whereby the ultrasonic beams deviate from the inspection plane while propagating through the anisotropic rotor blade at an anisotropic tilt angle associated with the anisotropic rotor blade; receiving, with the plurality of transducers, the echo signal corresponding with the geometric fiducial marker, the magnitude of the echo signal related to a magnitude of the anisotropic tilt angle.

The method as in any of the preceding clauses, further comprising determining the anisotropic tilt angle by repeating the scanning, determining, and adjusting steps until the magnitude and time delay of the echo signal corresponding with the geometric fiducial marker is within a predetermined maximum echo range.

The method as in any of the preceding clauses, wherein after the anisotropic tilt angle is determined, the method further comprises: adjusting the anisotropic rotor blade a final instance based on the anisotropic tilt angle; and scanning the anisotropic rotor blade for defects.

The method as in any of the preceding clauses, wherein the geometric fiducial marker is a ceiling of a cooling passage defined within an airfoil of the anisotropic rotor blade.

The method as in any of the preceding clauses, wherein scanning the sector comprises: transmitting, with a plurality of transducers of the probe, a plurality of ultrasonic beams at varying angles into the anisotropic rotor blade, the angles being defined between the respective ultrasonic beams and a wave normal direction that is perpendicular to the plurality of transducers, the angles varying from between about −5° and about 5°.

The method as in any of the preceding clauses, wherein the anisotropic rotor blade is formed from a single crystal alloy.

The method as in any of the preceding clauses, wherein the mounting portion of the anisotropic rotor blade includes a root face, and wherein the method comprises: positioning the probe of a phased array ultrasound system on the root face of the anisotropic rotor blade at the axial centerline.

The method as in any of the preceding clauses, wherein, after scanning the anisotropic rotor blade for defects a first time, the method further comprises: translating the probe away from the axial centerline of the anisotropic rotor blade and along the mounting portion; and scanning the anisotropic rotor blade for defects a second time.

The method as in any of the preceding clauses, wherein scanning the sector comprises: transmitting, with a plurality of transducers of the probe, a plurality of ultrasonic beams at varying depths into the anisotropic rotor blade, the depths being defined by pre-set region of interest.

The method as in any of the preceding clauses, wherein scanning the sector comprises simultaneous multi-depth and multi-angle focusing of the acoustic waves into the anisotropic blade.

A method for detecting defects in an anisotropic rotor blade using a phased array ultrasound system, the anisotropic rotor blade extending along an axial centerline and comprising a mounting portion and an airfoil, the method comprising: positioning a probe of the phased array ultrasound system on the mounting portion of the anisotropic rotor blade at the axial centerline; scanning a sector of the anisotropic rotor blade along the axial centerline with the probe of the phased array ultrasound system, a geometric fiducial marker disposed at least partially within the sector of the anisotropic rotor blade; determining a magnitude and a time delay of an echo signal corresponding with the geometric fiducial marker; adjusting delay laws of the probe based on the magnitude of the echo signal corresponding with the geometric fiducial marker; repeating the scanning, determining, and adjusting steps until the magnitude and the time delay of the echo signal corresponding with the geometric fiducial marker is within a predetermined maximum echo range; and scanning the anisotropic rotor blade for defects.

The method as in any of the preceding clauses, wherein scanning a sector of the anisotropic rotor blade comprises: transmitting, with a plurality of transducers, a plurality of ultrasonic signals into the anisotropic rotor blade along an inspection plane, whereby the ultrasonic signals deviate from the inspection plane while propagating through the anisotropic rotor blade at an anisotropic tilt angle associated with the anisotropic rotor blade; receiving, with the plurality of transducers, the echo signal corresponding with the geometric fiducial marker, the magnitude and the time delay of the echo signal related to a magnitude of the anisotropic tilt angle.

The method as in any of the preceding clauses, further comprising determining the anisotropic tilt angle by repeating the scanning, determining, and adjusting steps until the magnitude and the time delay of the echo signal corresponding with the geometric fiducial marker is within a predetermined maximum echo range.

The method as in any of the preceding clauses, wherein after the anisotropic tilt angle is determined, the method further comprises: adjusting the delay laws of the probe a final instance based on the anisotropic tilt angle; and scanning the anisotropic rotor blade for defects.

The method as in any of the preceding clauses, wherein the geometric fiducial marker is a ceiling of a cooling passage defined within an airfoil of the anisotropic rotor blade.

The method as in any of the preceding clauses, wherein scanning the sector comprises: transmitting, with a plurality of transducers of the probe, a plurality of ultrasonic beams at varying angles into the anisotropic rotor blade, the angles being defined between the respective ultrasonic beam and an axis normal to the plurality of transducers, the angles varying from between about −5° and about 5°.

The method as in any of the preceding clauses, wherein the anisotropic rotor blade is formed from a single crystal alloy.

The method as in any of the preceding clauses, wherein the mounting portion of the anisotropic rotor blade includes a root face, and wherein the method comprises: positioning the probe of a phased array ultrasound system on the root face of the anisotropic rotor blade at the axial centerline.

The method as in any of the preceding clauses, wherein, after scanning the anisotropic rotor blade for defects a first time, the method further comprises: translating the probe away from the axial centerline of the anisotropic rotor blade and along the mounting portion; and scanning the anisotropic rotor blade for defects a second time.

What is claimed is:

1. A method for detecting defects in an anisotropic rotor blade using a phased array ultrasound system, the anisotropic rotor blade extending along an axial centerline and comprising a mounting portion and an airfoil, the method comprising:

positioning a probe of the phased array ultrasound system on the mounting portion of the anisotropic rotor blade at the axial centerline;

scanning a sector of the anisotropic rotor blade along the axial centerline with the probe of the phased array ultrasound system, a geometric fiducial marker disposed at least partially within the sector of the anisotropic rotor blade;

determining a magnitude and a time delay of an echo signal corresponding with the geometric fiducial marker;

adjusting a position of one of the anisotropic rotor blade or the probe based on the magnitude of the echo signal corresponding with the geometric fiducial marker; and repeating the scanning, determining, and adjusting steps until the magnitude and the time delay of the echo signal corresponding with the geometric fiducial marker is within a predetermined maximum echo range; and scanning the anisotropic rotor blade for defects.

2. The method as in claim 1, wherein scanning a sector of the anisotropic rotor blade comprises:

transmitting, with a plurality of transducers, a plurality of ultrasonic beams into the anisotropic rotor blade along an inspection plane, whereby the ultrasonic beams deviate from the inspection plane while propagating through the anisotropic rotor blade at an anisotropic tilt angle associated with the anisotropic rotor blade;

receiving, with the plurality of transducers, the echo signal corresponding with the geometric fiducial marker, the magnitude of the echo signal related to a magnitude of the anisotropic tilt angle.

3. The method as in claim 2, further comprising determining the anisotropic tilt angle by repeating the scanning, determining, and adjusting steps until the magnitude and time delay of the echo signal corresponding with the geometric fiducial marker is within a predetermined maximum echo range.

4. The method as in claim 3, wherein after the anisotropic tilt angle is determined, the method further comprises:

adjusting the anisotropic rotor blade a final instance based on the anisotropic tilt angle; and scanning the anisotropic rotor blade for defects.

5. The method as in claim 1, wherein the geometric fiducial marker is a ceiling of a cooling passage defined within an airfoil of the anisotropic rotor blade.

6. The method as in claim 1, wherein scanning the sector comprises:

transmitting, with a plurality of transducers of the probe, a plurality of ultrasonic beams at varying angles into the anisotropic rotor blade, the angles being defined between the respective ultrasonic beams and a wave normal direction that is perpendicular to the plurality of transducers, the angles varying from between about −5° and about 5°.

7. The method as in claim 1, wherein the anisotropic rotor blade is formed from a single crystal alloy.

8. The method as in claim 1, wherein the mounting portion of the anisotropic rotor blade includes a root face, and wherein the method comprises:

positioning the probe of a phased array ultrasound system on the root face of the anisotropic rotor blade at the axial centerline.

9. The method as in claim 1, wherein, after scanning the anisotropic rotor blade for defects a first time, the method further comprises:

translating the probe away from the axial centerline of the anisotropic rotor blade and along the mounting portion; and scanning the anisotropic rotor blade for defects a second time.

10. The method as in claim 1, wherein scanning the sector comprises:

transmitting, with a plurality of transducers of the probe, a plurality of ultrasonic beams at varying depths into the anisotropic rotor blade, the depths being defined by pre-set region of interest.

11. The method as in claim 1, wherein scanning the sector comprises simultaneous multi-depth and multi-angle focusing of the acoustic waves into the anisotropic blade.

12. A method for detecting defects in an anisotropic rotor blade using a phased array ultrasound system, the anisotropic rotor blade extending along an axial centerline and comprising a mounting portion and an airfoil, the method comprising:

positioning a probe of the phased array ultrasound system on the mounting portion of the anisotropic rotor blade at the axial centerline;

scanning a sector of the anisotropic rotor blade along the axial centerline with the probe of the phased array ultrasound system, a geometric fiducial marker disposed at least partially within the sector of the anisotropic rotor blade;

determining a magnitude and a time delay of an echo signal corresponding with the geometric fiducial marker;

adjusting delay laws of the probe based on the magnitude of the echo signal corresponding with the geometric fiducial marker;

repeating the scanning, determining, and adjusting steps until the magnitude and the time delay of the echo signal corresponding with the geometric fiducial marker is within a predetermined maximum echo range; and scanning the anisotropic rotor blade for defects.

13. The method as in claim 12, wherein scanning a sector of the anisotropic rotor blade comprises:

transmitting, with a plurality of transducers, a plurality of ultrasonic signals into the anisotropic rotor blade along an inspection plane, whereby the ultrasonic signals deviate from the inspection plane while propagating through the anisotropic rotor blade at an anisotropic tilt angle associated with the anisotropic rotor blade;

receiving, with the plurality of transducers, the echo signal corresponding with the geometric fiducial marker, the magnitude and the time delay of the echo signal related to a magnitude of the anisotropic tilt angle.

14. The method as in claim 13, further comprising determining the anisotropic tilt angle by repeating the scanning, determining, and adjusting steps until the magnitude and the time delay of the echo signal corresponding with the geometric fiducial marker is within a predetermined maximum echo range.

15. The method as in claim 14, wherein after the anisotropic tilt angle is determined, the method further comprises:

adjusting the delay laws of the probe a final instance based on the anisotropic tilt angle; and scanning the anisotropic rotor blade for defects.

16. The method as in claim 12, wherein the geometric fiducial marker is a ceiling of a cooling passage defined within an airfoil of the anisotropic rotor blade.

17. The method as in claim 12, wherein scanning the sector comprises:

transmitting, with a plurality of transducers of the probe, a plurality of ultrasonic beams at varying angles into the anisotropic rotor blade, the angles being defined between the respective ultrasonic beam and an axis normal to the plurality of transducers, the angles varying from between about −5° and about 5°.

18. The method as in claim 12, wherein the anisotropic rotor blade is formed from a single crystal alloy.

19. The method as in claim 12, wherein the mounting portion of the anisotropic rotor blade includes a root face, and wherein the method comprises:

positioning the probe of a phased array ultrasound system on the root face of the anisotropic rotor blade at the axial centerline.

20. The method as in claim 12, wherein, after scanning the anisotropic rotor blade for defects a first time, the method further comprises:

translating the probe away from the axial centerline of the anisotropic rotor blade and along the mounting portion; and scanning the anisotropic rotor blade for defects a second time.

* * * * *